US011959843B2

(12) United States Patent
Kunc et al.

(10) Patent No.: US 11,959,843 B2
(45) Date of Patent: Apr. 16, 2024

(54) COOLING DEVICE

(71) Applicant: BERTIN TECHNOLOGIES, Montigny le Bretonneux (FR)

(72) Inventors: Thierry Kunc, Versailles (FR); Guillaume Fournel, Versailles (FR); Damien Diaz, Calas (FR)

(73) Assignee: BERTIN TECHNOLOGIES, Montigny le Bretonneux (FR)

( * ) Notice: Subject to any disclaimer, the term of this patent is extended or adjusted under 35 U.S.C. 154(b) by 1178 days.

(21) Appl. No.: 16/499,109

(22) PCT Filed: Mar. 30, 2018

(86) PCT No.: PCT/FR2018/050813
§ 371 (c)(1),
(2) Date: Sep. 27, 2019

(87) PCT Pub. No.: WO2018/178602
PCT Pub. Date: Oct. 4, 2018

(65) Prior Publication Data
US 2021/0310914 A1    Oct. 7, 2021

(30) Foreign Application Priority Data
Mar. 31, 2017   (FR) ...................................... 1752810

(51) Int. Cl.
*G01N 1/42*    (2006.01)
*F25D 3/12*    (2006.01)
(Continued)

(52) U.S. Cl.
CPC ................. *G01N 1/42* (2013.01); *F25D 3/12* (2013.01); *F25D 17/06* (2013.01); *G01N 1/286* (2013.01); *G01N 2001/2866* (2013.01)

(58) Field of Classification Search
CPC .. G01N 1/42; G01N 1/286; G01N 2001/2866; F25D 3/12; F25D 17/06; B02C 17/1815
See application file for complete search history.

(56) References Cited

U.S. PATENT DOCUMENTS

| 9,303,912 B1 | 4/2016 | Schalla et al. |
| 2005/0016199 A1* | 1/2005 | Blackstone ........... F24F 5/0017 62/421 |

(Continued)

FOREIGN PATENT DOCUMENTS

| FR | 2903026 A1 | 1/2008 |
| JP | 2011007472 A | 1/2011 |

OTHER PUBLICATIONS

Chinese Office Action issued in corresponding Chinese Patent Application No. 201880030840.9, dated Mar. 3, 2021, pp. 1-5.
(Continued)

*Primary Examiner* — Tarun Sinha
(74) *Attorney, Agent, or Firm* — HAUPTMAN HAM, LLP

(57) ABSTRACT

A device, in particular for a biological sample grinding apparatus, comprising a first enclosure comprising an internal chamber intended to receive a material capable of producing cold by sublimation under normal temperature and pressure conditions and comprising an opening making it possible for a fluidic communication with an internal chamber of a second enclosure through an opening of it. The device further comprising an air circuit making the outside air communicate with the internal chamber of the first enclosure, a blasting module making it possible for an air circulation in the air circuit from the outside up into the internal chamber of the first enclosure.

14 Claims, 4 Drawing Sheets

Figure 1:
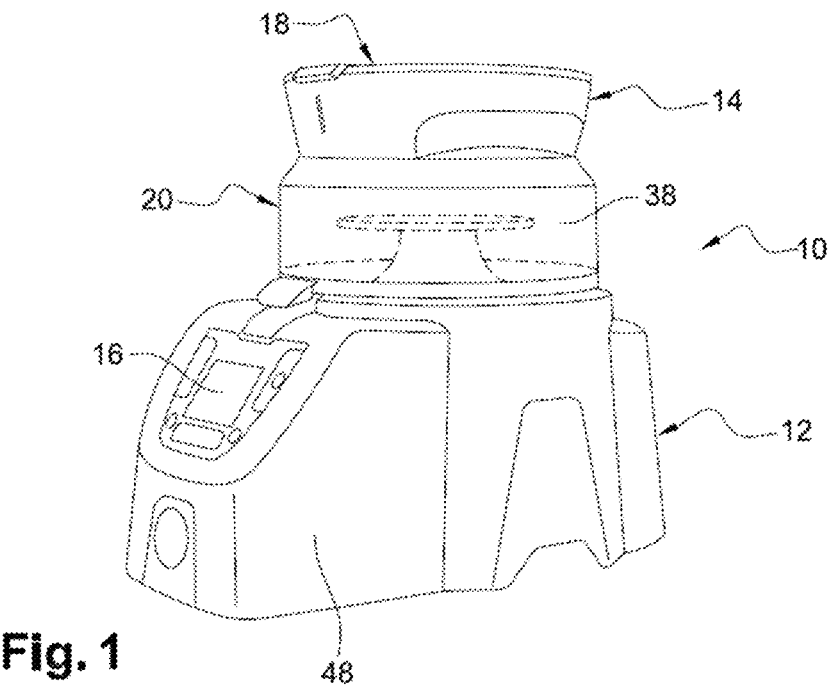
Figure 2:
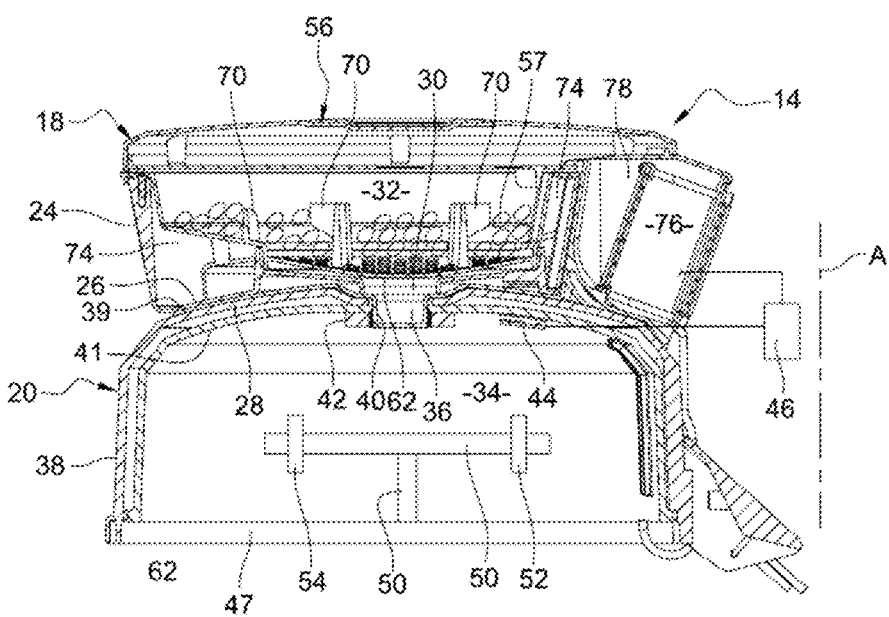
Figure 3:
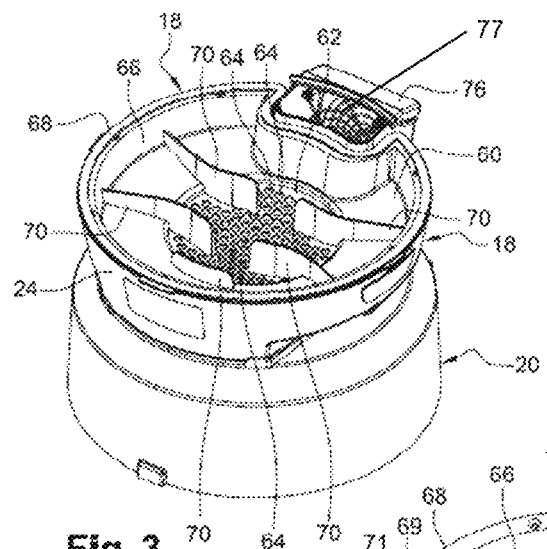

(51) Int. Cl.
*F25D 17/06* (2006.01)
*G01N 1/28* (2006.01)

(56) References Cited

U.S. PATENT DOCUMENTS

2014/0302485 A1    10/2014  Hart et al.
2015/0375932 A1*   12/2015  Anderson, III ...... B65D 88/745
                                                  73/863.11

OTHER PUBLICATIONS

Chinese Search Report issued in corresponding Chinese Patent Application No. 201880030840.9, dated Feb. 25, 2021, pp. 1-2.
Bertin Technologies: "User Manual CRYOLYS", Dec. 31, 2007, pp. 1-24, Retrieved from the Internet: URL: https://www.bertin-instruments.com/wp-content/uploads/secured-file/05068-800-DUO02-A-Cryolys-User-Manual.pdf.
International Search Report from corresponding International Application No. PCT/FR2018/050813, dated Jul. 25, 2018, pp. 1-3, European Patent Office, Rijswijk, The Netherlands.
Written Opinion of the International Searching Authority from corresponding International Application No. PCT/FR2018/050813, pp. 1-7, European Patent Office, Rijswijk, The Netherlands.

* cited by examiner

COOLING DEVICE

FIELD

The present invention relates, in particular, to the field of cooling devices, more specifically for biological sample grinding apparatuses.

CONTEXT

Sample grinding apparatuses are known from the prior art and in particular from document EP2035146, comprising mainly a plate supporting sample tubes at the periphery thereof and mounted at the end of a shaft driven in oscillating movement about a rotation centre situated on the axis of the shaft, by an electric motor by means of an eccentric drive. A pivoting cap is supported by a fixed body and covers the plate in view of grinding samples contained in the tubes.

To avoid the samples contained in the tubes being supported during the grinding thereof at an increased temperature by glass, ceramic microbeads, or any other suitable material contained in the tubes, it is provided to have cooling means around the oscillation zone of the tubes. The cold supply is generally produced by a connection of the cooling means to specific city driving, which provides a filtered cold air and without humidity. The absence of humidity in the cooling air indeed has proved to be a significant factor to avoid the formation of frost inside the enclosure housing the tubes. However, the connection to a cold network can prove to be difficult, even impossible, in certain geographic locations, which prevents the optimal use of the grinding device.

SUMMARY OF THE INVENTION

To this end, a device is proposed, in particular for a biological sample grinding apparatus, comprising a first enclosure comprising an internal chamber intended to receive a material capable of producing cold by sublimation under normal temperature and pressure conditions, and comprising an opening making it possible for a fluidic communication with an internal chamber of a second enclosure through an opening of said second enclosure, the device further comprising an air circuit, making the outside air communicate with the internal chamber of the first enclosure, blasting means making it possible for an air circulation in the air circuit from the outside up to into the internal chamber of the first enclosure. Temperature measuring means can be provided in the chamber of the second enclosure, and means for controlling the air blasting means can also be provided, according to the temperature in the chamber of the second enclosure.

Thus, the first enclosure and the second enclosure are fluidically connected to one another by openings and the control of the air flow supplying the chamber of the first enclosure, i.e. intended to come into contact with the material capable of producing cold by sublimation, makes it possible to supply the chamber of the second enclosure with a cold air flow controlled according to the temperature in it. The sublimation of the material makes it possible to reduce the partial saturation pressure in water of the cold air supplying the chamber of the second enclosure, which makes it possible to reduce the dew point temperature in the chamber of the second enclosure. Thus, the device functions by lowering the dew point temperature in the chamber of the second enclosure since the minimum temperature which is admissible for the walls of the second enclosure in contact with the cold air is lowered, these walls not condensing the water vapour contained in the air, as the temperature thereof is greater than the dew point temperature.

More specifically, the material capable of producing cold by sublimation can be $CO_2$ in the solid form, more specifically dry ice.

The term "normal temperature and pressure conditions" refers to an ambient temperature and pressure for using the device, in a laboratory, in particular, the temperature being close to 20° C. and the pressure close to the standard atmospheric pressure, of around 1 atm, i.e. 1.01325 bar.

The present document also relates to a device comprising a first enclosure comprising an internal chamber intended to receive a material capable of producing cold by sublimation under normal temperature and pressure conditions and comprising an opening. The device can further comprise an air circuit making the outside air communicate with the internal chamber of the first enclosure. It can also comprise blasting means, making it possible for an air circulation in the air circuit from the outside up to into the internal chamber of the first enclosure.

The following features equally apply to the devices described above. These devices can be qualified as cooling devices.

Preferably, the opening of the first enclosure is, for example, capable of making it possible for a fluidic communication with an internal chamber of a second enclosure through an opening of said second enclosure.

According to another aspect, the air circuit can house the air blasting means and can comprise an outlet opening into an upper portion of the first enclosure.

In a specific embodiment, the air circuit comprises an upstream conduit, of which an upstream end opens into the outside air.

In another embodiment, a downstream end of the conduit can open into a cavity of a double-walled cover, which cover can comprise an internal wall which can comprise a plurality of passages opening into the internal chamber of the first enclosure. This configuration makes it possible for a uniform distribution of air in the chamber of the first enclosure, thus ensuring a uniform contact of the air with the material capable of being sublimated.

Said upstream conduit can house the air blasting means and can be secured to the second enclosure. The air blasting means can also be connected to electrical supply means, also supported by the second enclosure. This type of configuration makes it possible to design the first enclosure without limitations linked to the use of electricity, since it comprises no electrical member.

In a specific embodiment, the air blasting means comprise a ventilator arranged at the inlet of the air circuit.

Advantageously, a cup for receiving said material is mounted fixed or removable inside the internal chamber of the first enclosure and can comprise a lower wall comprising a plurality of orifices, the cup preferably being positioned at a distance from a bottom wall of the first enclosure, wherein said opening of the first enclosure is formed. This arrangement makes it possible to maintain the material capable of being sublimated at a distance from the bottom wall, in order to guarantee an optimal air circulation from the first enclosure to another enclosure, such as the second enclosure, for example, through the material capable of being sublimated.

Thermal insulation means can be arranged between the cup and the bottom wall of the first enclosure around the opening of the first enclosure, so as to ensure a confinement of cold air and limit the thermal conduction towards the outside of the first enclosure.

In a more specific configuration, the first enclosure is arranged, for example removably, above the second enclosure and the opening of the first enclosure can be formed in a bottom wall or lower than it, the opening of the second enclosure could, for example, be formed in an upper wall of the second enclosure.

According to another aspect, the means for measuring the temperature comprise a temperature sensor supported by an internal face of the second enclosure and preferably in the proximity of the opening of the second enclosure.

It can be useful to have, in the internal chamber of the second enclosure, a plate for supporting tubes intended to contain biological samples, means for driving the plate in oscillatory movement about a rotation centre being provided, for example. The cold generated with the device and which circulates around the tubes comprises a humidity level which is sufficiently low, such that the dew point temperature can be lowered below the desired temperature in the internal chamber of the second enclosure.

Advantageously, the chamber of the second enclosure is fluidically connected to the outside air, which makes it possible to set the chamber to the outside pressure. Thus, the partial pressure increase of the material capable of being sublimated, while conserving the total pressure at the outside pressure, makes it possible to lower the partial pressure of vapour in the chamber of the second enclosure.

The present document also relates to a method for implementing the device such as described above, comprising the following steps:

- Filling the internal chamber of the first enclosure with a material capable of producing cold by sublimation under normal temperature and pressure conditions, such as carbon dioxide in solid form,
- Determining a target temperature to reach for the chamber of the second enclosure,
- Switching on the device so as to maintain the temperature of the chamber of the second enclosure at the target temperature by controlling the air flow supplying the chamber of the first enclosure.

Before starting the grinding cycle by the sample grinding apparatus, the blasting of outside air onto the carbon dioxide in solid form to the chamber of the second enclosure makes it possible for the fall in temperature of it and the lowering of the temperature of the dew point by introducing $CO_2$ which avoids the appearance of condensation or frost in the chamber of the second enclosure by inducing a high decrease of vapour pressure, the total pressure of the chamber of the second enclosure remaining equal the atmospheric one through openings on the outside.

Once the chamber of the second cooled enclosure, the grinding cycle starts. Maintaining the temperature in the chamber of the second enclosure during the grinding cycle is guaranteed by the blasting on the carbon dioxide, but also by the stirring of air inside the second chamber by the plate supporting the tubes and by significant thermal inertia of the tube support plate itself, imposing metal part.

The invention will be best understood and other details, features and advantages of the invention will appear upon reading the following description make as a non-limiting example in reference to the appended drawings.

BRIEF DESCRIPTION OF THE FIGURES

FIG. 1 is a schematic, perspective view of a biological sample grinding device on which is mounted a device for cooling said biological samples;

FIG. 2 is a schematic, cross-sectional view of the device according to the invention;

FIG. 3 is a schematic, perspective view of the device of FIG. 2, the cover not being represented;

FIG. 4 is a schematic, perspective view and insulated from a cup of the device of FIG. 3;

FIG. 5 is a schematic, perspective view of the device of FIG. 3, the cup having been removed;

FIG. 6 is a schematic, perspective view of the cooling device during the assembly to the biological sample grinding device;

FIG. 7 is a schematic, perspective view of a device according to the invention from the rear;

FIG. 8 is a schematic, perspective view from the bottom of the first enclosure of the cooling device according to the invention;

FIG. 9 is a schematic, perspective view of the cover of the cooling device of FIG. 2;

FIG. 10 is a known graph representing the evolution of the dew point (in ° C.) according to the temperature of air, for several humidity percentage points at a pressure of 1 atm;

FIG. 11 is a graph of the evolution of the saturating vapour pressure of water.

DETAILED DESCRIPTION

FIG. 1 represents an assembly 10 comprising a biological sample grinding device 12 and a cooling device 14 arranged above the sample grinding device 12. The assembly 10 comprises a control panel 16 of the sample grinding device 12 and of the cold producing device 14.

The cold producing device 14 comprises a first enclosure 18 arranged above the second enclosure 20 belonging to the sample grinding device 12. As can be seen in FIGS. 1 and 2, the first enclosure 18 or upper enclosure is supported removably by a second enclosure 20 or lower enclosure (FIG. 6). The first enclosure 18 can be locked in a mounting position on the second enclosure 20 by means of locking members 22 (FIG. 7).

The first enclosure 18 comprises a side annular wall 24 extending in a vertical direction A and a bottom wall 26 connected to the lower edge of the side annular wall 24 and of a shape, substantially complementary to an upper wall 28 of the second enclosure 20 or lower enclosure. The bottom wall 26 or lower wall of the upper enclosure 18 comprises an outlet opening 30 establishing a fluidic communication between an internal chamber 32 of the upper enclosure 18 and an internal chamber 34 of the lower enclosure 20 by way of an inlet opening 36 of the upper wall 28 of the lower enclosure 20. The upper wall 28 of the lower enclosure 20 is connected on the perimeter thereof to a side annular wall 38 extending substantially in the vertical direction A. As can be seen in FIG. 2, the lower wall 26 or bottom wall of the upper enclosure 18 is applied on an adaptation part 39 making it possible to achieve a coupling of shape between the first enclosure 18 and the second enclosure 20. This adaptation part 39 makes it possible to secure the upper enclosure 18 on the lower enclosure 20 by way of the locking members 22. This part 39 can comprise a central tubular portion 40 which is engaged in the opening 36 of the lower enclosure 20 and which receives a clamp nut 42. It is noted, that this nut 42 makes it possible to clamp together the upper wall 28, an upper wall 41 internally delimiting the chamber 34 and the wall 39. In practice, it is understood that the second enclosure 20 is double-walled. Also, it is noted that the internal chamber 34 of the lower enclosure 20 comprises means 44 for measuring the temperature in the chamber 34, which measuring means 44 of the temperature can be a sensor of the digital type and are supported by an internal face of a wall of the enclosure 20 internally delimiting the chamber 34 and are arranged in the proximity of the opening 36 of the lower enclosure 20. The means for measuring 44 the temperature are connected to means for controlling 46 an air flow for supplying the chamber 32 of the upper enclosure 18.

The lower enclosure 20 is formed by a removable cap and a portion 47 of the chassis. The removable cap can be mounted pivoting on the streamlined lower chassis 48 of the assembly 10 (FIG. 1). The lower enclosure 20 delimits an internal chamber 34, wherein is arranged a plate 50 supporting samples tubes 52 at the periphery thereof and mounted at the end of a shaft 54 driven in an oscillating movement about a rotation centre situated on the axis of the shaft 54. An electric motor is housed inside the streamlined chassis 48 and makes it possible for the oscillatory driving of the plate 50 and therefore of the tubes 52. When switched on, the lower edge of the side wall 38 of the second enclosure 20 or lower enclosure bears on the chassis 47 and thus covers the plate 50 and the tubes 52 for the grinding of the samples contained in the tubes 52.

The first enclosure 18 or upper enclosure comprises a cover pivoting 56 about a substantially horizontal axis. The external annular wall 24, the bottom wall 26 and the cover 56 together define the internal chamber 32, wherein is mounted removably a cup 58 intended to receive a material 57 capable of producing cold by sublimation under normal temperature and pressure conditions. The material 57 capable of being sublimated is preferably $CO_2$ in solid or dry ice form which has the advantage of being easily able to be handled in a laboratory.

Figure 4:
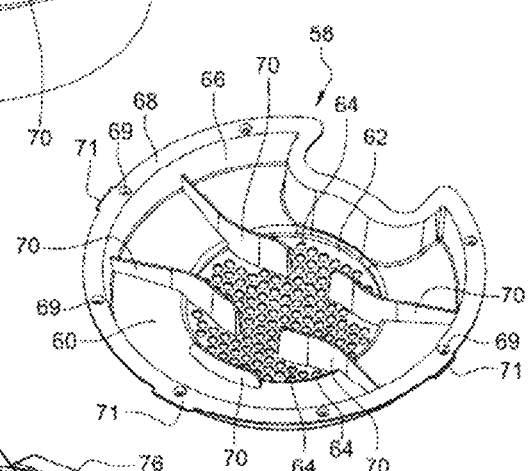

As represented in FIG. 4, the cup 58 comprises a truncated annular wall 60 of which the internal annular edge is connected to a rounded wall 62 comprising a concave internal face and a convex external face. In other words, the convexity of the curved or rounded wall 62 is rotated towards the outside, i.e. towards the internal chamber 34 of the second enclosure. The rounded wall 62 or lower wall comprises a plurality of orifices 64. The external annular edge of the truncated annular wall 60 is connected to a side annular wall 66 supporting an annular collar 68 intended to bear on the upper end of the side wall 24. The annular collar 68 comprises bores for the passage of screws for fixing the collar on the upper end of the side wall 24 of the first enclosure 18. The collar 68 also comprises lugs 71 distributed over the circumference thereof, in the present case, three lugs. These lugs 71 make it possible for a clipping of retaining member supported by the cover 56.

Figure 5:
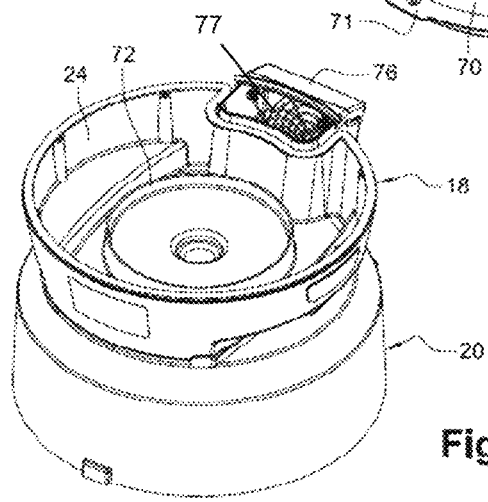

Curved or bent vanes 70 are formed inside the cup 58 and extend from the curved wall 62 up to the side annular wall 66 of the cup 58. These vanes 70 ensure a maintaining of the material 57 capable of being sublimated substantially uniformly distributed in the cup 58 during the handling of it. The cup 58 is supported by structural elements 72 formed protruding from the bottom wall 26 of the first enclosure 18 (FIG. 5).

Thermal insulation means are preferably arranged between the cup 58 and the bottom wall 26 of the first enclosure 18 around the opening 30 of the first enclosure 18 and between the cup 58 and the side wall 24, in the inserted housings 74 in order to limit the caloric losses by conducting cold towards the outside.

In order to establish an air circulation from the outside up to into the internal chamber 32 of the first upper enclosure, the device according to the invention comprises an air circuit, as well as blasting means 76 making it possible to establish the desired air flow direction (FIGS. 2, 3, 5 and 7).

The air circuit for supplying the internal chamber 32 of the first chamber 18 with air is made of two portions, an upstream portion formed by a conduit 78 secured to the lower enclosure 20 and more specifically, of the upper wall 28 of the lower enclosure 20 and a downstream portion formed by the cover 56. The upstream conduit 78 houses the blasting means 76 in the vicinity of the upstream end thereof opening into the outside air. It will be noted, that the air blasting means 76 are thus supported by the lower enclosure 20 and that the electrical supply 79 thereof can thus be achieved by way of means for electrically supplying the sample grinding device 12. Thus, the upper enclosure 18 which is optional to the operation of the grinding device 12, can be designed without any electrical connection member or element, which greatly simplifies the production thereof.

Figure 6:
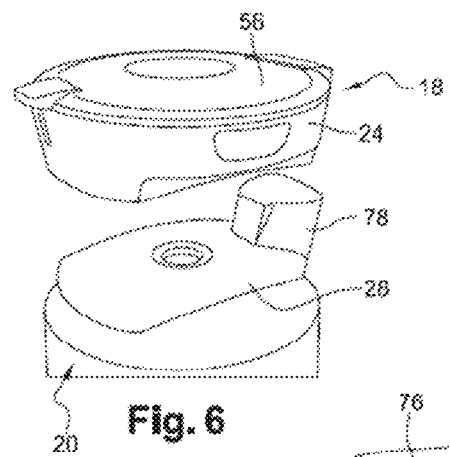
Figure 7:
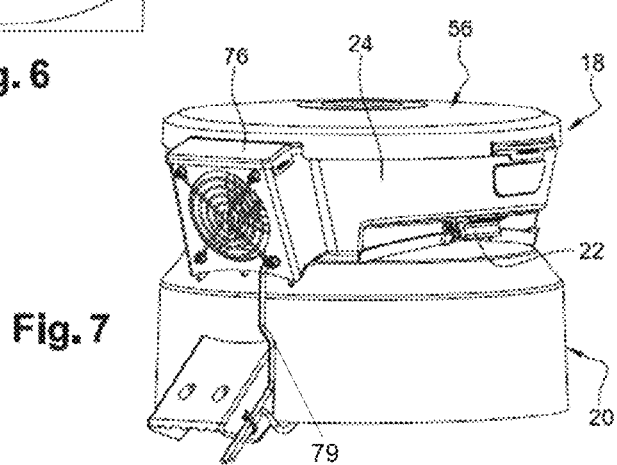
Figure 8:
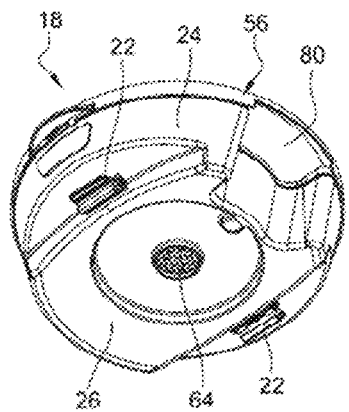
Figure 9:
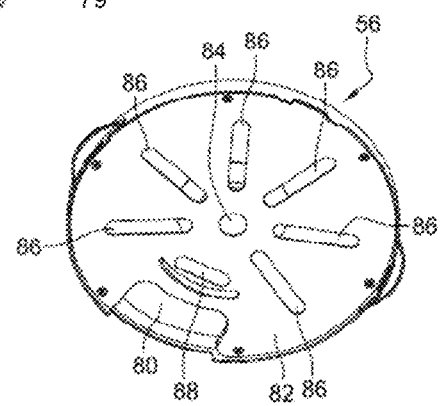

As represented in FIGS. 6 and 7, the conduit 78 of the lower enclosure 20 is formed on the perimeter of the upper wall 28 of the enclosure 20 and with a shape substantially complementary to that of a reinforcement of the side annular wall 24 of the upper enclosure 18. The downstream end of the conduit 78 is engaged in an opening of the cover 56 in order to establish an air communication between the outside air and a cavity of the cover 56 (FIGS. 8 and 9). This cavity of the cover 56 is delimited between an external wall 80 and an internal wall 82, the internal wall comprising a first central passage 84 which is circular and second passages 86 of an oblong shape, of which the greatest dimension extends substantially radially with respect to the first passage 84. A third passage 88 is formed between the opening or recess of the internal wall 82 of the cover 56 and the first passage 84. As can be seen, the cover 56 can have a substantially circular shape.

The air circulation is achieved as follows. The blasting means 76 pulse an air circulation direction in the upstream conduit 78 up to into the cavity of the cover 56. The air then passes through the passages of the internal wall of the cover 56, the air then circulating upon contact with the material 57, capable of being sublimated, housed in the cup 58 which is mounted in the chamber of the upper enclosure. Upon contact with air, the material 57 is sublimated more or less according to the air flow entering into the internal chamber 32. The cold air coming from the sublimation of the material 57 then circulates through the orifices 64 of the cup 58 into the opening 30 of the upper enclosure 18 and into the opening 36 of the second enclosure 20 up to into the chamber 34 in order to cool the tubes there, when they are subjected to a grinding action of the samples housed in the tubes 52.

In order to achieve an optimal cold air supply of the chamber 32 of the upper enclosure 18, the blasting means 76 are controlled by control means 46 making it possible to control the outside air flow pulsed in the air circuit according to the temperature in the chamber 34 of the lower enclosure 18. The controlling of the ventilator 77 can be carried out with a controlling of the PWM type, which means "pulse width modulation".

Figure 10:
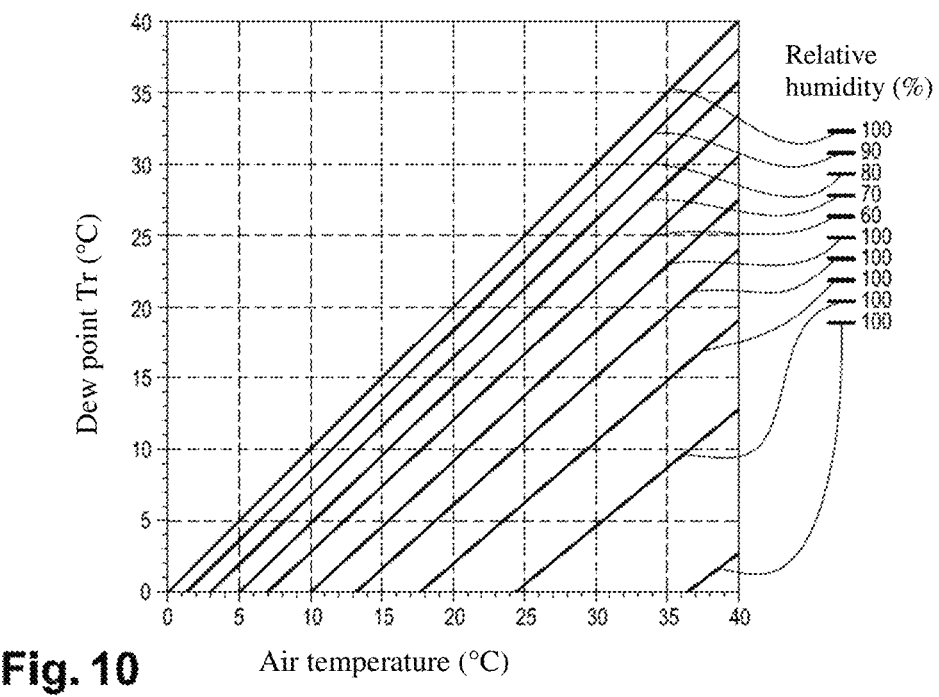
Figure 11:
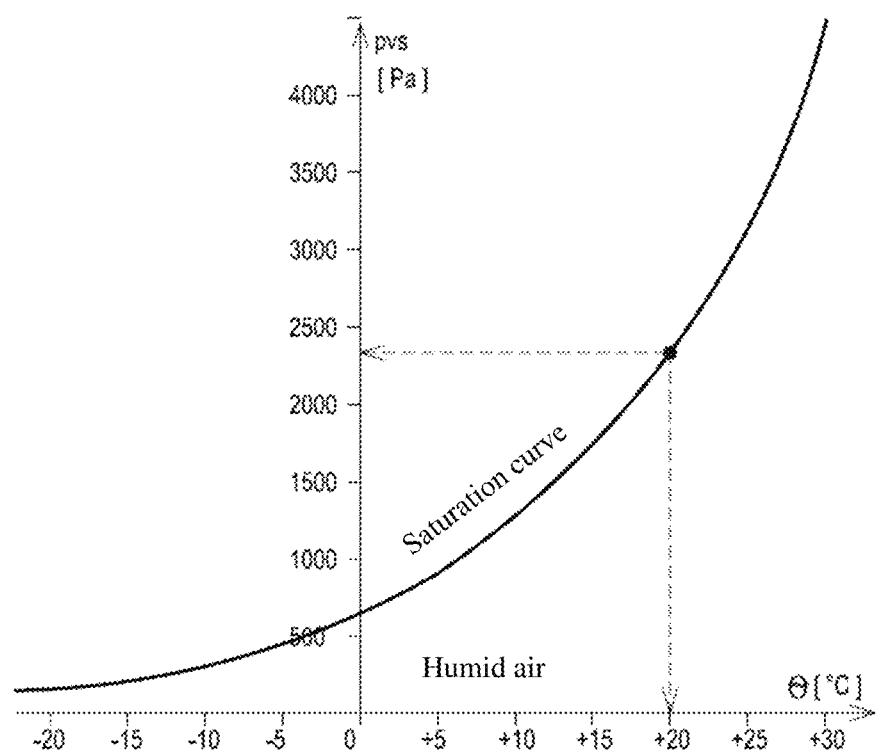

In a practical example of using the device according to the invention under standard laboratory conditions: temperature of the outside air of around 20° C. comprising a humidity rate of 50%, leading to a dew point temperature of +10° C., the sublimation of the solid $CO_2$ produces twice more gaseous $CO_2$ as air in transit. Thus, in the air/$CO_2$ mixture obtained, the dilution of the water vapour causes the fall in the partial saturation pressure thereof to reach a dew point temperature of −10° C. (FIG. 10). FIG. 11 also makes it possible to understand that the fall in the partial pressure of the water vapour in the chamber 34 of the second enclosure 20 makes it possible to lower the dew point temperature.

It will be noted, that the air supply in the chamber 34 of the upper enclosure 20 does not induce any notable overpressure in this chamber 34 due to the pressure increase generated by the blasting means is low and there are air outlet orifices towards the outside of which the dimensions are sufficient for evacuating air towards the outside air and for maintaining the total pressure in the chamber 34 at the outside pressure. Thus, by the unclosed design of the chamber 34 and the low flow of blasting means, the pressure in the chamber 34 is always equal to the outside pressure, i.e. the atmospheric pressure, 1013 mbar inside the chamber, which makes it possible to decrease the temperature of the dew point during the addition of $CO_2$ by sublimation of the dry ice.

Indeed, the sublimation of the dry ice produces a certain quantity of $CO_2$ in the second chamber which highly dilutes the vapour pressure inside it and therefore the saturation pressure responsible for the condensation and for the frost. As the second chamber is not closed hermetically, in this there is always: Patm=Pair+Pvap=1013 mbar or Pvap=Psat× RH (Relative Humidity).

With the sublimation of the dry ice, there is: Patm=Pair+Pvap+$PCO_2$=1013 mbar.

Thus, the vapour pressure will highly fall, for example down to 1 mbar, hence a very low saturation pressure, for example, 200 Pa for a laboratory atmosphere with a relative humidity of 50% and a negative dew point.

If the invention is particularly useful in a configuration, wherein the first enclosure is arranged above the second enclosure, to have a good compacity of the device and a flow of cold air from the top to the bottom, it is understood, that the invention can function with a first enclosure and second enclosure arranged relative to one another in the space differently and for example, side-to-side. The invention also covers embodiments, wherein the outlet opening 30 and the inlet opening 36 are connected to one another by a flexible or rigid conduit, generally by any means making it possible to produce a cold air flow between the chamber 32 of the first enclosure 18 and the chamber 34 of the second enclosure 20.

The invention claimed is:

1. A device, in particular for a biological sample grinding apparatus, comprising a first enclosure comprising an internal chamber intended to receive a material capable of producing cold by sublimation under normal temperature and pressure conditions and comprising an opening for a fluidic communication with an internal chamber of a second enclosure through an opening of said second enclosure, the device further comprising an air circuit making outside air communicate with the internal chamber of the first enclosure, an air blasting module for an air circulation in the air circuit from outside up to into the internal chamber of the first enclosure, as well as a measuring module for measuring the temperature in the internal chamber of the second enclosure and a controlling module for controlling the air blasting module according to the temperature in the internal chamber of the second enclosure, wherein a cup for receiving said material is mounted fixed or removably inside the internal chamber of the first enclosure and comprises a lower wall comprising a plurality of orifices, the cup being positioned at a distance from a bottom wall of the first enclosure wherein is formed the opening of the first enclosure.

2. The device according to claim 1, wherein the air circuit houses the air blasting module and comprises an outlet opening into an upper portion of the first enclosure.

3. The device according to claim 1, wherein the air circuit comprises an upstream conduit of which an upstream end opens into the outside air.

4. The device according to claim 3, wherein a downstream end of the conduit opens into a cavity of a double-walled cover, of which an internal wall comprises a plurality of passages opening into the internal chamber of the first enclosure.

5. The device according to claim 3, wherein said upstream conduit houses the air blasting module and is secured to the second enclosure, the air blasting module connected to an electrical supply module also supported by the second enclosure.

6. The device according to claim 1, wherein the air blasting module comprise a ventilator arranged at the inlet of the air circuit.

7. The device according to claim 1, wherein thermal insulation elements are arranged between the cup and the bottom wall of the first enclosure around the opening of the first enclosure.

8. The device according to claim 1, wherein the first enclosure is arranged above the second enclosure and the opening of the first enclosure is formed in a bottom wall or lower wall, and wherein the opening of the second enclosure is formed in an upper wall of the second enclosure.

9. The device according to claim 8, wherein the first enclosure is mounted removably on the second enclosure.

10. The device according to claim 1, wherein the measuring module for measuring the temperature comprises a temperature sensor supported by an internal face of the second enclosure and in the proximity of the opening of the second enclosure.

11. The device according to claim 1, wherein a plate for supporting tubes intended to contain biological samples is arranged inside the chamber of the second enclosure, elements for driving the plate in an oscillatory movement about a rotation centre being also provided.

12. The device according to claim 1, wherein the internal chamber of the second enclosure is fluidically connected to the outside air.

13. A method for implementing the device according to claim 1, comprising:
   filling the internal chamber of the first enclosure with a material capable of producing cold by sublimation under normal temperature and pressure conditions, such as carbon dioxide in solid form;
   determining a target temperature to reach for the internal chamber of the second enclosure; and
   switching on the device so as to maintain the temperature of the internal chamber of the second enclosure at the target temperature by controlling an air flow supplying the chamber of the first enclosure.

14. The method of claim 13, wherein the filling the internal chamber comprises filling the cup for receiving said material inside the internal chamber of the first enclosure.

* * * * *